United States Patent
Chuang et al.

(10) Patent No.: US 9,866,848 B2
(45) Date of Patent: *Jan. 9, 2018

(54) METHOD AND APPARATUS FOR LINE BUFFER REDUCTION FOR VIDEO PROCESSING

(71) Applicant: HFI Innovation Inc., Zhubei, Hsinchu County (TW)

(72) Inventors: Tzu-Der Chuang, Hsin-Chu (TW); Yu-Wen Huang, Hsin-Chu (TW); Ching-Yeh Chen, Hsin-Chu (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,401

(22) Filed: Aug. 9, 2017

(65) Prior Publication Data

US 2017/0339419 A1 Nov. 23, 2017

Related U.S. Application Data

(63) Continuation of application No. 13/985,282, filed as application No. PCT/CN2012/074524 on Apr. 23, 2012, now Pat. No. 9,762,918.

(Continued)

(51) Int. Cl.
*H04N 19/176* (2014.01)
*H04N 19/167* (2014.01)
(Continued)

(52) U.S. Cl.
CPC ......... *H04N 19/176* (2014.11); *H04N 19/102* (2014.11); *H04N 19/13* (2014.11);
(Continued)

(58) Field of Classification Search
None
See application file for complete search history.

(56) References Cited

U.S. PATENT DOCUMENTS

| 6,438,254 B1 | 8/2002 | Kadono et al. |
| 7,262,721 B2 | 8/2007 | Jeon et al. |

(Continued)

FOREIGN PATENT DOCUMENTS

| CN | 1980395 | 6/2007 |
| CN | 101076114 | 11/2007 |

(Continued)

OTHER PUBLICATIONS

European Search Report dated Jul. 23, 2014, issued in application No. EP 12792295.

(Continued)

*Primary Examiner* — Peter D Le
(74) *Attorney, Agent, or Firm* — McClure, Qualey & Rodack, LLP

(57) ABSTRACT

A method for encoding luma intra mode using context adaptive entropy processing determines a current luma intra mode for a current block and determines whether a neighboring block of the current block within a region of an independently coded slice is on a different side of a boundary of the region from the current block. The method replaces prediction mode information associated with the neighboring block by DC mode if the neighboring block is on the different side of the boundary of the region from the current block, and forms data for processing a current syntax element associated with the current luma intra mode based on the prediction mode information associated with the neighboring block. In addition, the method performs context adaptive entropy encoding processing on the current syntax element according to the formed data.

17 Claims, 7 Drawing Sheets

Related U.S. Application Data

(60) Provisional application No. 61/533,895, filed on Sep. 13, 2011, provisional application No. 61/490,805, filed on May 27, 2011.

(51) Int. Cl.
*H04N 19/159* (2014.01)
*H04N 19/102* (2014.01)
*H04N 19/91* (2014.01)
*H04N 19/463* (2014.01)
*H04N 19/13* (2014.01)

(52) U.S. Cl.
CPC ......... *H04N 19/159* (2014.11); *H04N 19/167* (2014.11); *H04N 19/463* (2014.11); *H04N 19/91* (2014.11)

(56) References Cited

U.S. PATENT DOCUMENTS

| | | |
|---|---|---|
| 8,995,527 B2 | 3/2015 | Panchal et al. |
| 2002/0051496 A1* | 5/2002 | Hashimoto .......... H04N 19/527 375/240.27 |
| 2004/0086047 A1 | 5/2004 | Kondo et al. |
| 2005/0062746 A1 | 3/2005 | Kataoka et al. |
| 2005/0123207 A1 | 6/2005 | Marpe et al. |
| 2006/0013320 A1 | 1/2006 | Oguz et al. |
| 2006/0176953 A1 | 8/2006 | Mohsenian |
| 2007/0183491 A1 | 8/2007 | Pearson et al. |
| 2007/0253479 A1 | 11/2007 | Mukherjee |
| 2008/0075173 A1 | 3/2008 | Jain et al. |
| 2008/0232471 A1 | 9/2008 | Mittal et al. |
| 2010/0007532 A1 | 1/2010 | Tanaka et al. |
| 2010/0098154 A1 | 4/2010 | Lou et al. |
| 2010/0158130 A1 | 6/2010 | Chen et al. |
| 2011/0243226 A1 | 10/2011 | Choi et al. |
| 2012/0014431 A1 | 1/2012 | Zhao et al. |
| 2012/0014437 A1 | 1/2012 | Segall et al. |
| 2012/0014439 A1 | 1/2012 | Segall et al. |
| 2012/0099654 A1 | 4/2012 | Chen et al. |
| 2012/0163448 A1 | 6/2012 | Zheng et al. |
| 2012/0163472 A1 | 6/2012 | Sole Rojals et al. |
| 2013/0028323 A1* | 1/2013 | Miyoshi ............... H04N 19/126 375/240.13 |
| 2016/0065966 A1 | 3/2016 | Yu |

FOREIGN PATENT DOCUMENTS

| | | |
|---|---|---|
| CN | 101099391 | 1/2008 |
| CN | 101115201 | 1/2008 |
| CN | 101267559 | 9/2008 |
| CN | 101578877 | 11/2009 |
| CN | 101765016 | 6/2010 |
| KR | 20060082199 | 7/2006 |

OTHER PUBLICATIONS

Zhao, J., et al.; Parallel Entropy Decoding for High-Resolution Video Coding; Visual Communications and Image Processing; Jan. 2009.

Chuang, T.D., et al.; "CE1.A.3: Reducing Line 1-15 Buffers for CABAC;" Joint Collaborative Team on Video Coding of ISO/IEC JTC1/SC29/WG11 and ITU-T SG16; Nov. 2011.

Lee, T., et al.; "On Line Buffer Removal for 1-15 CU Split Flag and Skip Flag Context Model;" Joint Collaborative Team on Video Coding of ISO/IEC JTC1/SC29/WG11 and ITU-T SG16; Nov. 2011.

Francois, E., et al.; "Storage Reduction in Dependent Tiles;" Joint Collaborative Team on Video Coding (JCT-VC) of ITU-T SG16 WP3 AND ISO/IEC JTC1/SC29/WG11; Feb. 2012; pp. 1-4.

* cited by examiner

METHOD AND APPARATUS FOR LINE BUFFER REDUCTION FOR VIDEO PROCESSING

CROSS REFERENCE TO RELATED APPLICATIONS

The present invention is a continuation of U.S. patent application Ser. No. 13/985,282, filed on Aug. 13, 2013, which is a national phase of PCT Patent Application No. PCT/CN2012/074524, filed on Apr. 23, 2012, which further claims priority to U.S. Provisional Patent Application Ser. No. 61/490,805, filed May 27, 2011 and U.S. Provisional Patent Application Ser. No. 61/533,895, filed Sep. 13, 2011. The U.S. Patent Application, PCT Patent Application and U.S. Provisional Patent Applications are hereby incorporated by reference in their entireties.

FIELD OF THE INVENTION

The present invention relates to video coding or video processing. In particular, the present invention relates to reduction of line buffer requirement, where the entropy coding a current block is dependent on one or more neighboring blocks.

BACKGROUND

In video coding, block information of neighboring blocks are usually utilized to predict syntax elements, such as motion data, of a current block. The neighboring blocks usually correspond to blocks previously processed so that the information of the neighboring blocks can be derived at the decoder side without side information or with minimum side information. The correlation among an underlying block and neighboring blocks may be utilized to improve the coding efficiency of Entropy Coding (EC). To exploit the correlation among the underlying block and neighboring blocks, context-based adaptive entropy coding (also called context adaptive entropy coding) has been used extensively in newer video coding systems such as H.264 and the emerging High Efficiency Video Coding (HEVC) system. There are two types of EC modes. One mode is Context-based Adaptive Binary Arithmetic Coding (CABAC), and the other mode is Context-based Adaptive Variable Length Coding (CAVLC). In both CABAC and CAVLC, information from neighboring blocks is often used as contexts for entropy coding a syntax element of the current block.

The neighboring blocks may be these blocks on the upper side and/or left side of the current block. When the blocks in a picture are processed in a raster scan order, a line buffer may be required to store information associated with blocks in a previous row. For example, a processing unit used in HEVC Test Model version 3.0 (HM-3.0) may correspond to a Coding Unit (CU), a Prediction Unit (PU), a Transform Unit (TU), or a Largest CU (LCU). In the case of CAVLC coding of motion vector difference (MVD) of the current block, it requires the MVs of the left block and the upper block for context formation. Therefore, the information associated with motion vectors for the blocks in a previous row of LCUs has to be buffered if the processing order is LCU row by LCU row. In HEVC, CABAC and CAVLC are used to encode various syntax elements associated with the blocks. The line buffer size may be very large, especially for large-size pictures. Therefore, it is desirable to develop method and apparatus to reduce the line buffer requirement for neighboring-block-dependent processing such as CABAC and CAVLC.

BRIEF SUMMARY OF THE INVENTION

In one embodiment, a method for encoding luma intra mode using context adaptive entropy processing determines a current luma intra mode for a current block and determines whether a neighboring block of the current block within a region of an independently coded slice is on a different side of a boundary of the region from the current block. The method replaces prediction mode information associated with the neighboring block by DC mode if the neighboring block is on the different side of the boundary of the region from the current block, and forms data for processing a current syntax element associated with the current luma intra mode based on the prediction mode information associated with the neighboring block. In addition, the method performs context adaptive entropy encoding processing on the current syntax element according to the formed data.

In another embodiment, a method for decoding luma intra mode using context adaptive entropy processing is provided. The method comprises: receiving a current syntax element associated with a current luma intra mode of a current block from a bitstream; determining whether a neighboring block of the current block within a region of an independently coded slice is on a different side of a boundary of the region from the current block; replacing prediction mode information associated with the neighboring block by DC mode if the neighboring block is on the different side of the boundary of the region from the current block; forming data for processing the current syntax element based on the prediction mode information associated with the neighboring block; and performing context adaptive entropy decoding processing on the current syntax element according to the formed data to determine the current luma intra mode. The region is a row of largest coding units (LCUs) or a tile.

In another embodiment, an apparatus for encoding luma intra mode using context adaptive entropy processing is provided. The apparatus comprises one or more circuits configured to: determine a current luma intra mode for a current block; determine whether a neighboring block of the current block within a region of an independently coded slice is on a different side of a boundary of the region from the current block; replace prediction mode information associated with the neighboring block by DC mode if the neighboring block is on the different side of the boundary of the region from the current block; form data for processing a current syntax element associated with the current luma intra mode based on the prediction mode information associated with the neighboring block; and perform context adaptive entropy encoding processing on the current syntax element according to the formed data. The region is a row of largest coding units (LCUs) or a tile.

In another embodiment, an apparatus for decoding luma intra mode using context adaptive entropy processing is provided. The apparatus comprises one or more circuits configured to: receive a current syntax element associated with a current luma intra mode of a current block from a bitstream; determine whether a neighboring block of the current block within a region of an independently coded slice is on a different side of a boundary of the region from the current block; replace prediction mode information associated with the neighboring block by DC mode if the neighboring block is on the different side of the boundary of the region from the current block; form data for processing the current syntax element based on the prediction mode information associated with the neighboring block; and perform context adaptive entropy decoding processing on the current syntax element according to the formed data to determine the current luma intra mode, wherein the region is a row of largest coding units (LCUs) or a tile.

In another embodiment, a non-transitory computer readable medium storing a computer-executable program si provided. The computer-executable program, when executed, causing a decoder to perform the following steps: receiving a current syntax element associated with a current luma intra mode of a current block from a bitstream; determining whether a neighboring block of the current block within a region of an independently coded slice is on a different side of a boundary of the region from the current block; replacing prediction mode information associated with the neighboring block by DC mode if the neighboring block is on the different side of the boundary of the region from the current block; forming data for processing the current syntax element based on the prediction mode information associated with the neighboring block; and performing context adaptive entropy decoding processing on the current syntax element according to the formed data to determine the current luma intra mode, wherein the region is a row of largest coding units (LCUs) or a tile.

DETAILED DESCRIPTION OF THE INVENTION

Figure 1A:
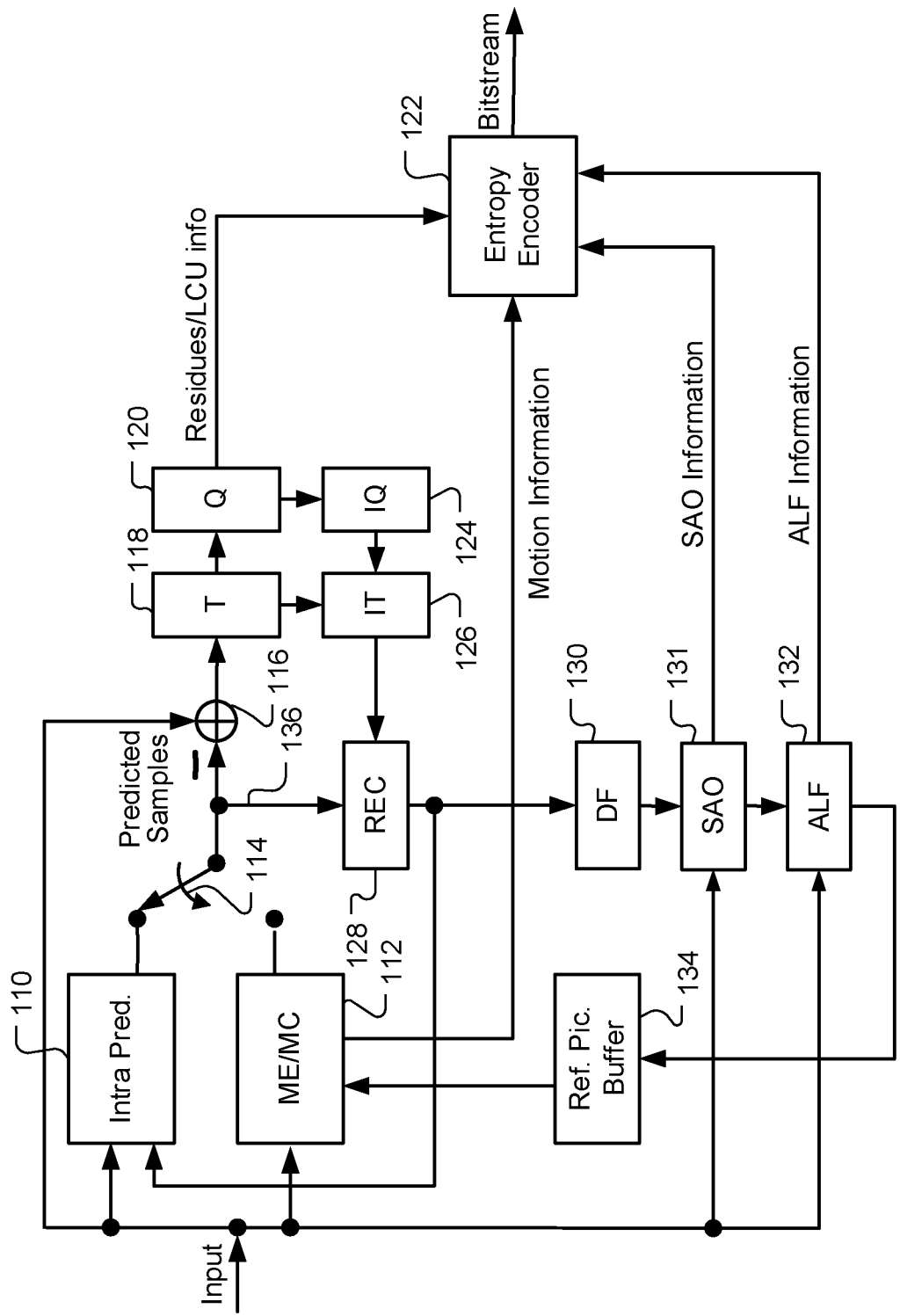
FIG. 1A illustrates an exemplary adaptive inter/intra video encoding system with DF, SAO and ALF in-loop processing.

FIG. 1A illustrates an exemplary adaptive inter/intra video coding system incorporating in-loop processing. For inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the video data. The side information may also be subject to entropy coding to reduce required bandwidth. Accordingly, the data associated with the side information are provided to Entropy Encoder 122 as shown in FIG. 1A. When an inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The in-loop filter information may have to be incorporated in the bitstream so that a decoder can properly recover the required information. Therefore, in-loop filter information from SAO and ALF is provided to Entropy Encoder 122 for incorporation into the bitstream. In FIG. 1A, DF 130 is applied to the reconstructed video first; SAO 131 is then applied to DF-processed video; and ALF 132 is applied to SAO-processed video. However, the processing order among DF, SAO and ALF can be re-arranged.

Figure 1B:
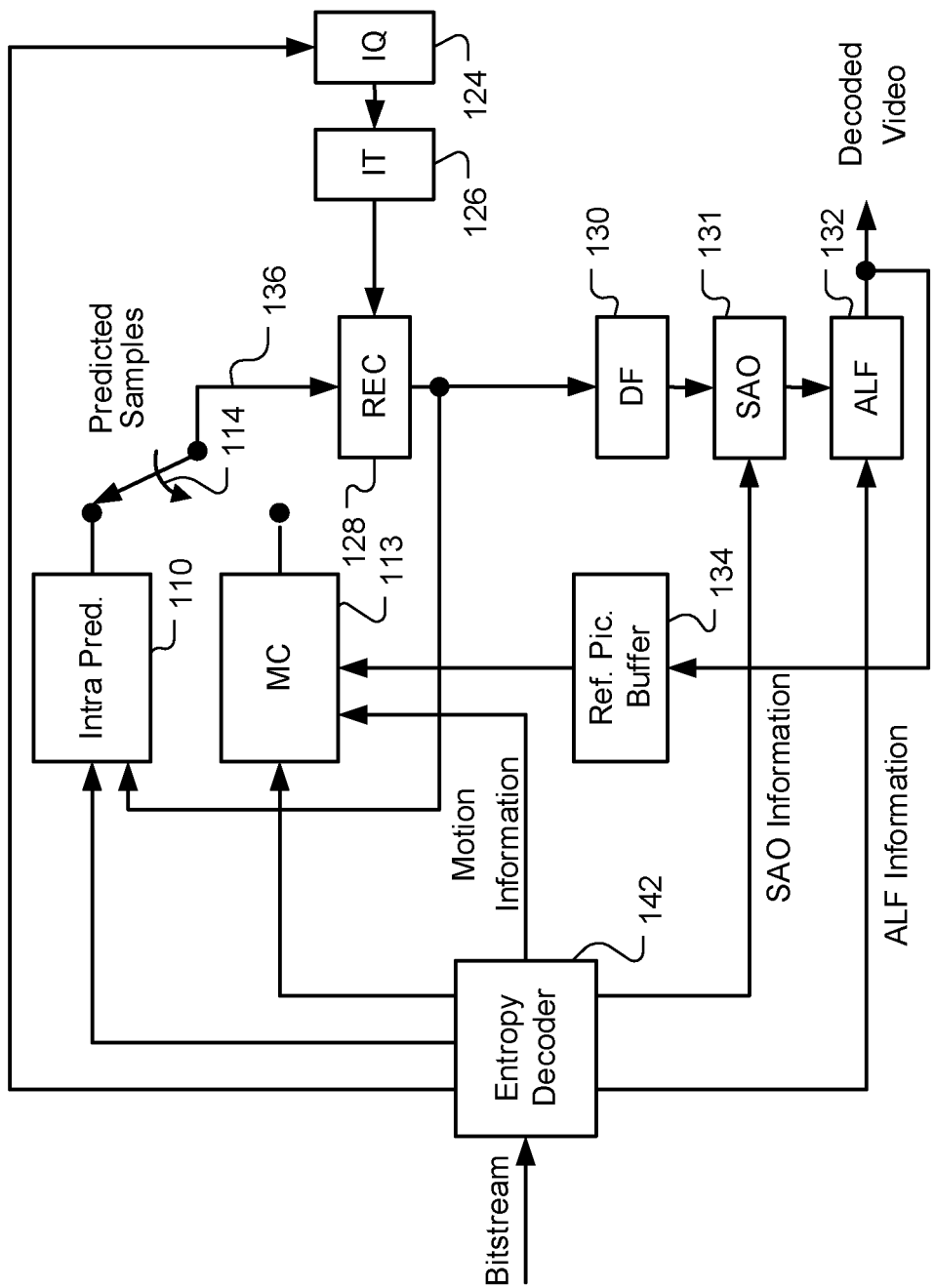
FIG. 1B illustrates an exemplary adaptive inter/intra video decoding system with DF, SAO and ALF in-loop processing.

A corresponding decoder for the encoder of FIG. 1A is shown in FIG. 1B. The video bitstream is decoded by Video Decoder 142 to recover the transformed and quantized residues, SAO/ALF information and other system information. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

Entropy Encoder 122 in FIG. 1A and Entropy Decoder 142 in FIG. 1B support CABAC and/or CAVLC for various syntax elements used in the coding system. Beside residual information, associated side information such as motion information, SAO information and ALF information are also incorporated in the bitstream. In order to represent the side information efficiently, the side information is also processed using CABAC or CAVLC as shown in FIG. 1A and FIG. 1B.

Figure 2:
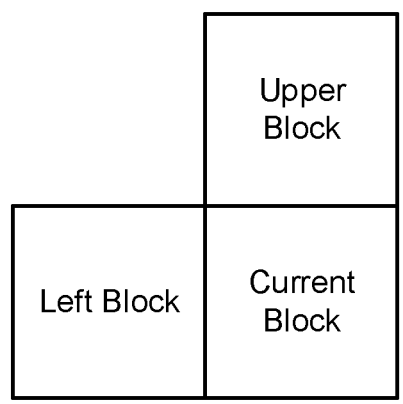
FIG. 2 illustrates an example of context-based syntax element processing using block information associated with two neighboring blocks.

FIG. 2 illustrates an exemplary context adaptive processing of a current block based on two neighboring blocks corresponding to CABAC coding of motion vector difference (MVD) of HEVC Test Model version 3.0 (HM-3.0). The motion vector difference (MVD) of the current block is processed by CABAC and the context formation requires the MVDs of the left block and the upper block for context formation. Since the LCUs are processed in a raster scan order, the buffer for storing left block information is very small and can be easily implemented as on-chip memory, which will not increase any external memory access. However, for upper block information, line buffers whose sizes are proportional to the picture width are required to store information from the upper LCU row. If on-chip line buffers are used, the chip area and cost will be significantly increased. If line buffers are implemented as external memory, the external memory bandwidth will be significantly increased. Therefore, it is desirable to design video encoding and decoding algorithms with reduced line buffer requirements.

In the above example, the context of CABAC is based on the MVDs of the left block and the upper block as shown in FIG. 2. The information that is used to form context may include split_flag, skip_flag, motion information, coding mode, inter prediction direction, reference index, luma intra mode, chroma intra mode, and partition information. Table 1 illustrates examples of CABAC/CAVLC coding for various syntax elements and the required information to be stored in line buffers. For example, when the split flag is entropy coded using CABAC, the depth information of the neighboring blocks has to be stored in line buffers for the next LCU row. In another example, when the merge index is entropy coded using either CABAC or CAVLC, both MV and reference index of the neighboring blocks have to be stored in line buffers for the next LCU row. As shown in Table 1, the context stored in the line buffers includes syntax elements to be processed by CABAC or CAVLC as well as other block information that may not processed by CABAC or CAVLC.

While Table 1 illustrates some exemplary syntax elements to be processed by CABAC or CAVLC, other syntax elements may also be processed by CABAC or CAVLC. Other syntax elements to be processed by CABAC or CAVLC include partition size, prediction mode, motion vector difference, delta quantization parameter, significant flag, last significant flag, coefficient greater than one, coefficient-magnitude-minus-one, Adaptive Loop Filter (ALF) control flag, ALF flag, ALF filter length, ALF filter coefficients, Sample Adaptive Offset (SAO) flag, SAO filter length, SAO filter coefficients, transform subdivision flags, residual quad-tree Coded Block Flag (CBF), and residual quad-tree root CBF, may also be processed using CABAC or CAVLC. As is noted in Table 1, the information to be stored in the line buffers may be significant. It is desirable to reduce or remove the line buffer requirement.

TABLE 1

| Entropy Coder | Syntax Element | Line Buffer |
| --- | --- | --- |
| CABAC | split flag | depth information |
| CABAC | skip flag | leaf-CU skip flag |
| CABAC | merge flag | PU skip flag |
| CABAC | merge index | PU MV, reference index |
| CABAC | chroma intra mode | chroma mode |
| CABAC | luma intra mode | luma intra mode |
| CABAC | inter prediction direction | inter prediction direction |
| CABAC | motion vector difference | threshold of MVD |
| CABAC | motion vector predictor index | MV |
| CABAC | reference index | reference index |
| CABAC | residual quad-tree CBF | residual quad-tree CBF |
| CABAC | residual quad-tree root CBF | residual quad-tree root CBF |
| CAVLC | merge index | PU MV, reference index |
| CAVLC | luma intra mode | luma intra mode |
| CAVLC | inter prediction direction | inter prediction direction |
| CAVLC | reference index | reference index |
| CAVLC | motion vector predictor index | MV |

Figure 3:
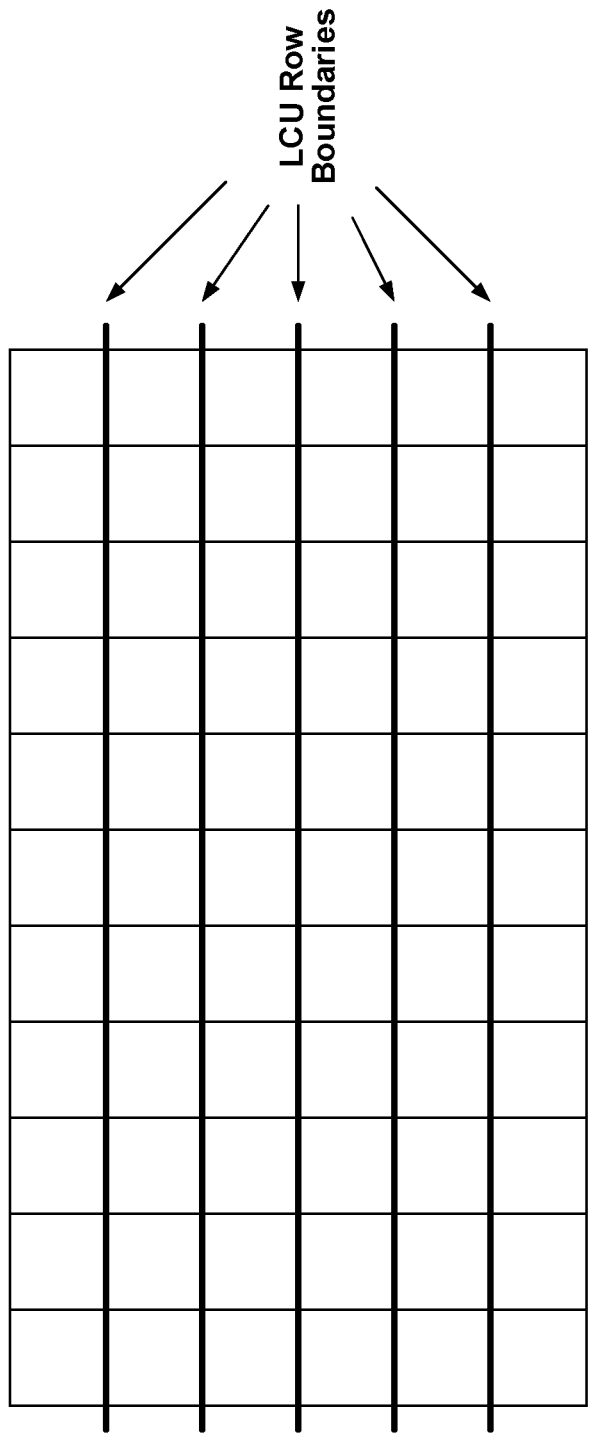
FIG. 3 illustrates an example of line buffer requirement related to LCU row boundaries for context-based entropy coding.

The block used for video processing may be a Prediction Unit (PU) used for motion prediction, a Transform Unit (TU) for transform process, a Coding Unit (CU), a Largest CU (LCU), or other block structure. Very often, an HEVC-based video coding system processes an underlying picture on an LCU basis and the LCUs in a picture are processed in raster scan order, i.e., row by row and from top to the bottom of the picture. Due to the dependence of a current block on its neighboring blocks related to context formation for CABAC or CAVLC, information from a previous LCU may have to be stored. FIG. 3 illustrates the LCU row boundaries of a picture, where each square corresponds to an LCU. The LCU may be adaptively partitioned into smaller processing units such as CUs. For the blocks immediately below an LCU boundary, context based processing of the syntax element of a current block may require information associated with blocks above the respective LCU boundary. Therefore, line buffers will be required to store information associated with blocks above the respective LCU boundary. The line buffer requirement grows linearly with the picture width. For wide picture, the storage requirement may become significant.

Figure 4:
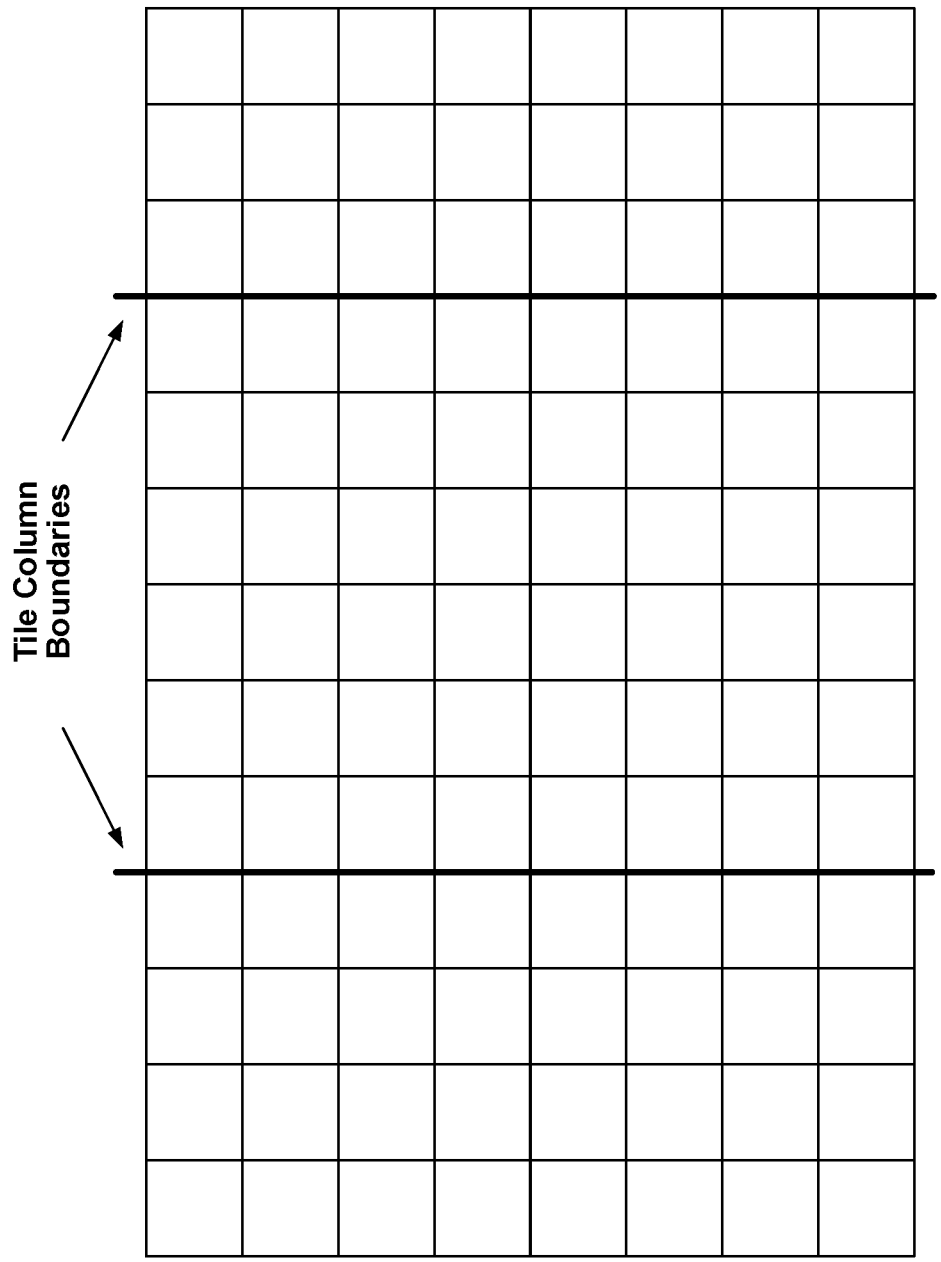
FIG. 4 illustrates an example of column buffer requirement related to tile column boundaries for context-based entropy coding.

While a picture may be divided into LCUs and processed LCU row by LCU row as shown in FIG. 3, a picture may also be divided into vertical tiles as shown in FIG. 4, where each square represents an LCU. The picture is processed tile by tile from left to right. Due to the dependence of a current block on its neighboring blocks related to context formation for CABAC or CAVLC, information from a previous tile may have to be stored if the context information for a block at the vertical tile boundary requires information from the left block. Therefore, column buffers are used and the size of the buffer is proportional to the picture height. A column buffer may be considered as a vertical line buffer. Consequently, the line buffer may also refer to a column buffer in this disclosure.

Figure 5:
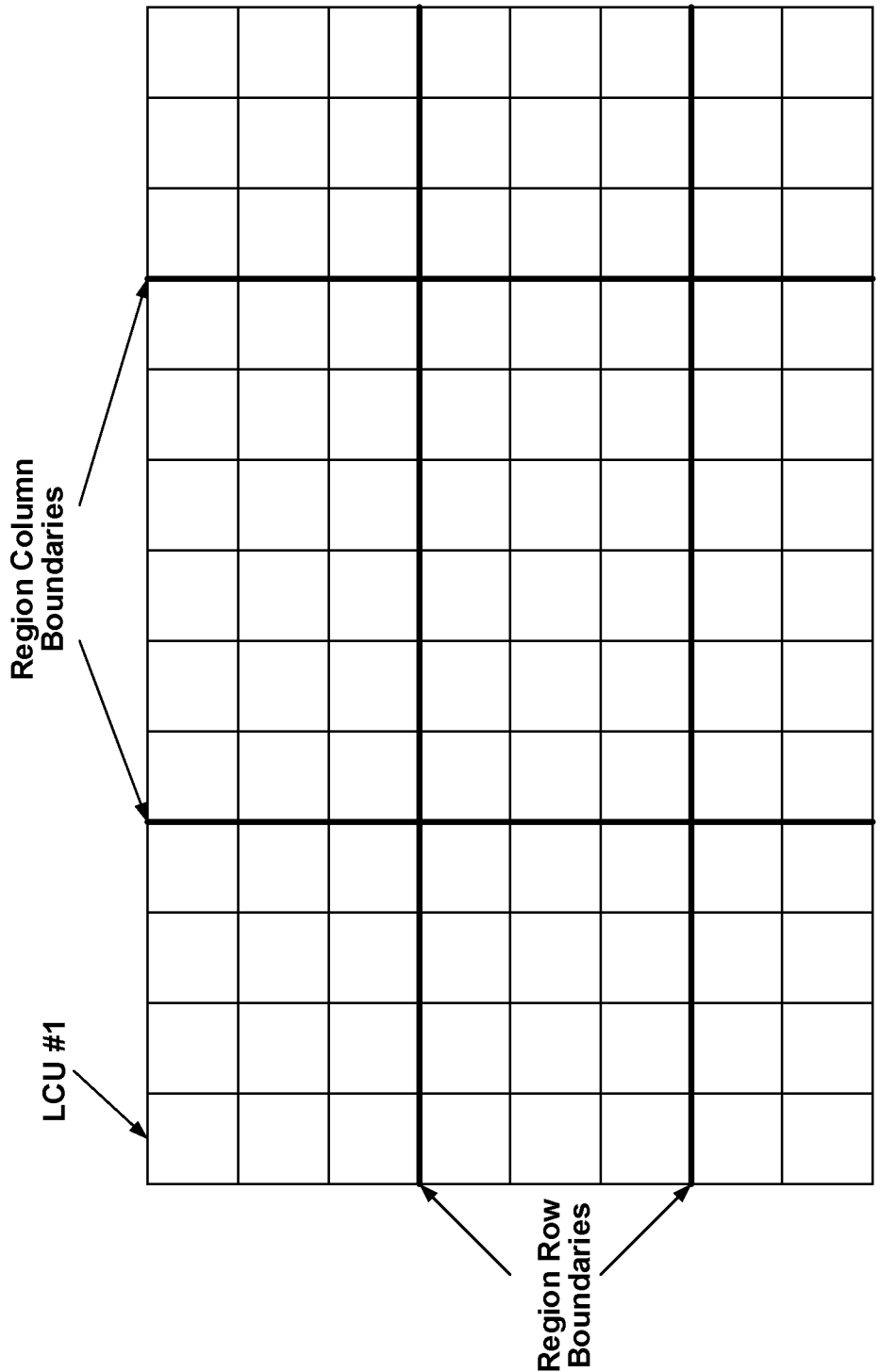
FIG. 5 illustrates an example of line buffer requirement related to region row boundaries and column buffer requirement related to region column boundaries for context-based entropy coding.

A picture may also be processed region by region where the picture is partitioned into regions. Each region may consist of M×N blocks, CUs or LCUs. The regions can be processed according to the raster scan order. Alternatively, the regions may be scanned column by column and from left to right. In an extreme case, N is equal to the number of LCUs in picture height. In other words, a region may correspond to a tile. In another extreme case, M is equal to the number of LCUs in picture width. In other words, a region may correspond to one or more LCU rows. FIG. 5 illustrates an example of region partition of a picture where each square is an LCU and the region size varies through the picture. For region based processing, column buffers (i.e., vertical line buffers) will be required, where the column buffer size is proportional to the vertical region size. Furthermore, line buffers may also be required in addition to column buffer. As mentioned earlier, the term line buffer may refer to horizontal line buffer and/or vertical line buffer. Also it is understood that the line size is not necessarily referring to the picture width.

In order to remove line buffer requirement, an embodiment according to the present invention modifies the context formation for LCU row by LCU row based processing when the upper block is not in the current LCU row. If the upper block does not belong to the current LCU row, the information associated with the upper block is not used for the context formation. In this case, the upper block may be treated as unavailable or may be replaced by any other causal block in the current LCU row. A causal block is a previously processed block. Accordingly, no line buffer is needed for CABAC or CAVLC. For example, the luma intra mode coding/decoding using CABAC/CAVLC in HEVC requires the luma intra mode of upper block and luma intra mode of left block, as shown in FIG. 2. An embodiment according to the present invention will treat the upper block as unavailable if the upper block is not in the current LCU row. If the value for an upper block is not available, a pre-defined value or a user defined value may be used. For example, in the case of CABAC coding for the intra luma prediction mode, DC mode or Planar mode may be used as the pre-defined mode for the upper block above the LCU row boundary. Other pre-defined intra luma mode may also be used.

Similarly, for the tile-based processing shown FIG. 4, CABAC or CAVLC processing of a to-be-processed unit (e.g. CU or PU or TU) of one tile according to the present invention will not use any data from a left tile for context formation. If the left block does not belong to the current tile, the information associated with the left block is not used for the context formation. In this case, the left block may be treated as unavailable or may be replaced by any other causal block in the current LCU row. Accordingly, no column buffer (i.e., vertical line buffer) is needed for CABAC or CAVLC. For example, the luma intra mode coding/decoding using CABAC/CAVLC in HEVC requires the luma intra mode of upper block and luma intra mode of left block, as shown in FIG. 2. An embodiment according to the present invention will treat the left block as unavailable if the left block is not in the current tile. If the value for a left block is not available, a pre-defined value or a user-defined value may be used. For example, in the case of CABAC coding for the intra luma prediction mode, DC mode or Planar mode may be used as the pre-defined mode for the left block on the left side of a tile boundary. Other intra luma mode may also be used.

When a picture is partitioned into regions, line buffers for both vertical region boundaries and horizontal region boundaries may be required. The embodiments of the present invention disclosed earlier for removing the line buffers associated with the horizontal LCU row and the line buffer associated with the vertical tile boundaries can be applied to region-based CABAC and CAVLC processing to remove the line buffer requirement.

Figure 6:
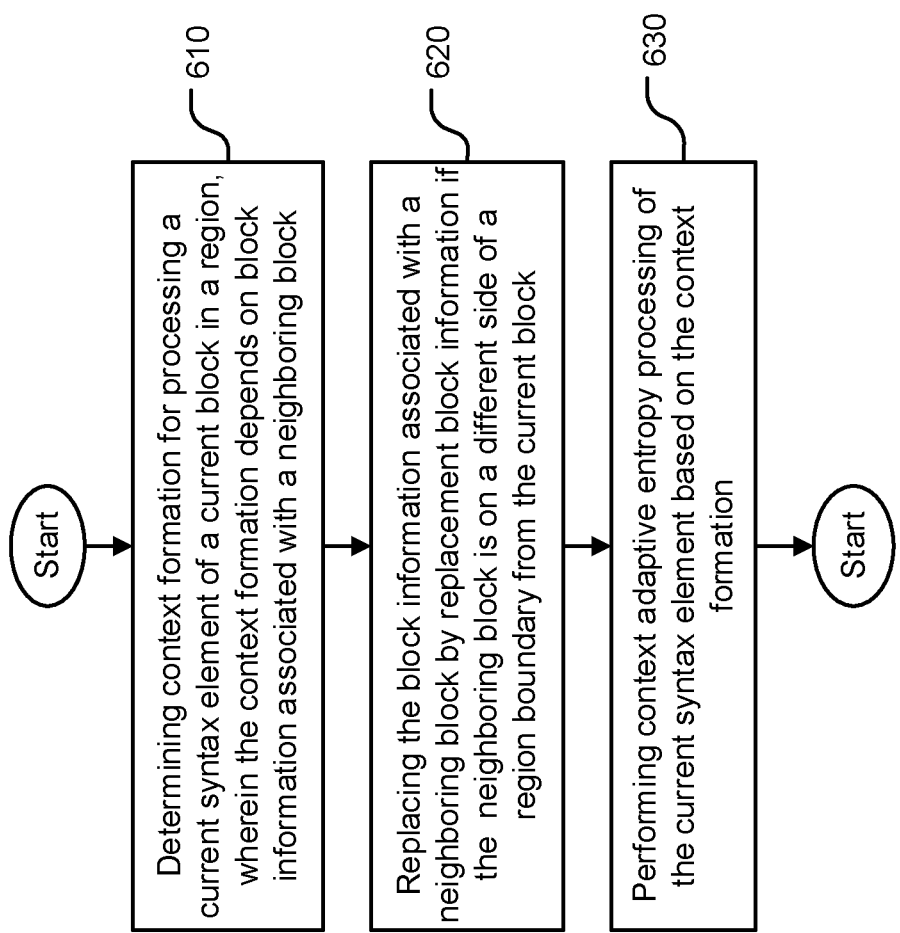
FIG. 6 illustrates an exemplary flowchart for removing line buffer requirement related to region boundaries for context-based entropy coding.

FIG. 6 illustrates an exemplary flowchart for removing line buffer requirement related to region boundaries for context-based entropy coding according to an embodiment of the present invention. The context formation for processing a current syntax element of a current block in a region is determined in step 610, wherein the context formation depends on block information associated with a neighboring block. If the neighboring block is on a different side of a region boundary from the current block, the block information associated with a neighboring block is replaced by replacement block information in step 620. After the context formation is done, the context adaptive entropy processing of the current syntax element can be performed based on the context formation as shown in step 630. The flowchart in FIG. 6 illustrates an example of line buffer reduction according to an embodiment of the present invention. A skilled person may practice the present invention by re-arranging the steps and/or modifying individual steps to achieve the same effect.

Embodiment of line buffer reduction for context adaptive entropy processing according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for encoding luma intra mode using context adaptive entropy processing, the method comprising:
  determining a current luma intra mode for a current block;
  determining whether a neighboring block of the current block within a region of an independently coded slice is on a different side of a boundary of the region from the current block;
  replacing prediction mode information associated with the neighboring block by DC mode if the neighboring block is on the different side of the boundary of the region from the current block;
  forming data for processing a current syntax element associated with the current luma intra mode based on the prediction mode information associated with the neighboring block; and
  performing context adaptive entropy encoding processing on the current syntax element according to the formed data,
  wherein the region is a row of largest coding units (LCUs) or a tile.

2. The method of claim 1, wherein the context adaptive entropy encoding processing is CABAC encoding or CAVLC encoding.

3. The method of claim 1, wherein the replaced prediction mode information is not processed by the context adaptive entropy encoding processing associated with the neighboring block.

4. The method of claim 1, wherein the boundary of the region corresponds to a horizontal boundary, and wherein the neighboring block corresponds to an above-left block, an above block, or an above-right block of the current block.

5. The method of claim 4, wherein the horizontal boundary corresponds to a LCU row boundary or a tile boundary.

6. The method of claim 1, wherein the boundary of the region corresponds to a vertical boundary, and wherein the neighboring block corresponds to a left block, a bottom-left block, or an above-left block of the current block.

7. The method of claim 6, wherein the vertical boundary corresponds to a LCU column boundary or a tile boundary.

8. A method for decoding luma intra mode using context adaptive entropy processing, the method comprising:

receiving a current syntax element associated with a current luma intra mode of a current block from a bitstream;

determining whether a neighboring block of the current block within a region of an independently coded slice is on a different side of a boundary of the region from the current block;

replacing prediction mode information associated with the neighboring block by DC mode if the neighboring block is on the different side of the boundary of the region from the current block;

forming data for processing the current syntax element based on the prediction mode information associated with the neighboring block; and performing context adaptive entropy decoding processing on the current syntax element according to the formed data to determine the current luma intra mode, wherein the region is a row of largest coding units (LCUs) or a tile.

9. The method of claim 8, wherein the context adaptive entropy decoding processing is CABAC decoding or CAVLC decoding.

10. The method of claim 8, wherein the replaced prediction mode information is not processed by the context adaptive entropy decoding processing associated with the neighboring block.

11. The method of claim 8, wherein the boundary of the region corresponds to a horizontal boundary, and wherein the neighboring block corresponds to an above-left block, an above block, or an above-right block of the current block.

12. The method of claim 11, wherein the horizontal boundary corresponds to a LCU row boundary or a tile boundary.

13. The method of claim 8, wherein the boundary of the region corresponds to a vertical boundary, and wherein the neighboring block corresponds to a left block, a bottom-left block, or an above-left block of the current block.

14. The method of claim 13, wherein the vertical boundary corresponds to a LCU column boundary or a tile boundary.

15. An apparatus for encoding luma intra mode using context adaptive entropy processing, the apparatus comprising one or more circuits configured to:

determine a current luma intra mode for a current block;

determine whether a neighboring block of the current block within a region of an independently coded slice is on a different side of a boundary of the region from the current block;

replace prediction mode information associated with the neighboring block by DC mode if the neighboring block is on the different side of the boundary of the region from the current block;

form data for processing a current syntax element associated with the current luma intra mode based on the prediction mode information associated with the neighboring block; and perform context adaptive entropy encoding processing on the current syntax element according to the formed data, wherein the region is a row of largest coding units (LCUs) or a tile.

16. An apparatus for decoding luma intra mode using context adaptive entropy processing, the apparatus comprising one or more circuits configured to:

receive a current syntax element associated with a current luma intra mode of a current block from a bitstream;

determine whether a neighboring block of the current block within a region of an independently coded slice is on a different side of a boundary of the region from the current block;

replace prediction mode information associated with the neighboring block by DC mode if the neighboring block is on the different side of the boundary of the region from the current block;

form data for processing the current syntax element based on the prediction mode information associated with the neighboring block; and perform context adaptive entropy decoding processing on the current syntax element according to the formed data to determine the current luma intra mode, wherein the region is a row of largest coding units (LCUs) or a tile.

17. A non-transitory computer readable medium storing a computer-executable program, the computer-executable program, when executed, causing a decoder to perform the following steps:

receiving a current syntax element associated with a current luma intra mode of a current block from a bitstream;

determining whether a neighboring block of the current block within a region of an independently coded slice is on a different side of a boundary of the region from the current block;

replacing prediction mode information associated with the neighboring block by DC mode if the neighboring block is on the different side of the boundary of the region from the current block;

forming data for processing the current syntax element based on the prediction mode information associated with the neighboring block; and performing context adaptive entropy decoding processing on the current syntax element according to the formed data to determine the current luma intra mode, wherein the region is a row of largest coding units (LCUs) or a tile.

* * * * *